United States Patent
Yang et al.

(10) Patent No.: US 9,363,780 B2
(45) Date of Patent: Jun. 7, 2016

(54) SYSTEM AND METHOD OF UPLINK POWER CONTROL IN A WIRELESS COMMUNICATION SYSTEM

(75) Inventors: Rongzhen Yang, Shanghai (CN); Kamran Etemad, Potomac, MD (US); Hujun Yin, Santa Clara, CA (US); Apostolos Papathanassiou, San Jose, CA (US); Xiaogang Chen, Beijing (CN); Huaning Niu, Milpitas, CA (US); Alexei Davydov, Nizhny Novgorod (RU); Yujian Zhang, Beijing (CN); Yuan Zhu, Beijing (CN); Jong-Kae Fwu, Sunnyvale, CA (US); Qinghua Li, San Ramon, CA (US); Yi Hsuan, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 103 days.

(21) Appl. No.: 13/976,452

(22) PCT Filed: Dec. 16, 2011

(86) PCT No.: PCT/US2011/065604
§ 371 (c)(1), (2), (4) Date: Jun. 26, 2013

(87) PCT Pub. No.: WO2013/025236
PCT Pub. Date: Feb. 21, 2013

(65) Prior Publication Data
US 2013/0294390 A1 Nov. 7, 2013

Related U.S. Application Data

(60) Provisional application No. 61/523,080, filed on Aug. 12, 2011.

(51) Int. Cl.
*H04W 4/00* (2009.01)
*H04W 56/00* (2009.01)
(Continued)

(52) U.S. Cl.
CPC ......... *H04W 56/0045* (2013.01); *H04L 1/0003* (2013.01); *H04L 1/0026* (2013.01);
(Continued)

(58) Field of Classification Search
CPC ............ H04W 56/0045; H04W 52/34; H04W 52/146; H04W 52/241; H04W 42/241; H04W 5/0032; H04W 5/0073; H04W 24/02; H04W 24/08; H04W 13/0062; H04W 72/04; H04W 72/0473; H04W 72/042; H04W 72/0453; H04L 5/0032; H04L 5/0073; H04L 5/001; H04L 5/0091; H04L 5/0057; H04L 1/0003; H04L 1/0026; H04J 13/0062
See application file for complete search history.

(56) References Cited

U.S. PATENT DOCUMENTS 8,150,443 B2 * 4/2012 Pedersen et al. .............. 455/522
2010/0067496 A1 3/2010 Choi
(Continued)

OTHER PUBLICATIONS

International Search Report and Written Opinion, Mailed Date: May 29, 2012, Application No. PCT/US2011/065604, Filed Date: Dec. 16, 2011, pp. 9.
(Continued)

Primary Examiner — Kevin Mew

(57) ABSTRACT

An apparatus may include a transceiver operable to receive a downlink message from a base station for a serving cell, the downlink message allocating a set of control parameters. The apparatus may also include a processor circuit communicatively coupled to the transceiver and an uplink power control module operable on the processor circuit to read the set of control parameters, and apply a signal-to-noise-and-interference (SINR) parameter based on the received set of control parameters to determine physical uplink shared channel (PUSCH) power to be applied for a PUSCH transmission. Other embodiments are disclosed and claimed.

22 Claims, 12 Drawing Sheets

(51) Int. Cl.
  H04W 52/34 (2009.01)
  H04L 5/00 (2006.01)
  H04W 24/02 (2009.01)
  H04L 1/00 (2006.01)
  H04W 52/14 (2009.01)
  H04W 52/24 (2009.01)

(52) U.S. Cl.
  CPC .............. *H04L 5/001* (2013.01); *H04L 5/0032* (2013.01); *H04L 5/0057* (2013.01); *H04L 5/0073* (2013.01); *H04L 5/0091* (2013.01); *H04W 24/02* (2013.01); *H04W 52/34* (2013.01); *H04W 52/146* (2013.01); *H04W 52/241* (2013.01)

(56) References Cited

U.S. PATENT DOCUMENTS

| | | | |
|---|---|---|---|
| 2010/0246463 A1* | 9/2010 | Papasakellariou et al. | ... 370/311 |
| 2010/0285830 A1 | 11/2010 | Englund et al. | |
| 2010/0296470 A1* | 11/2010 | Heo et al. | ....... 370/329 |
| 2010/0317339 A1* | 12/2010 | Koc | ........ H04L 5/0007 455/424 |
| 2011/0190026 A1* | 8/2011 | Nishikawa et al. | ........... 455/522 |
| 2011/0195735 A1 | 8/2011 | Irmer et al. | |
| 2011/0205929 A1* | 8/2011 | Quek | .................... H04W 16/30 370/252 |
| 2011/0207415 A1* | 8/2011 | Luo et al. | .......... 455/68 |
| 2012/0028673 A1* | 2/2012 | Jeong | ............ 455/522 |
| 2012/0224552 A1* | 9/2012 | Feuersanger et al. | ......... 370/329 |
| 2013/0010720 A1* | 1/2013 | Lohr et al. | .................... 370/329 |
| 2013/0058315 A1* | 3/2013 | Feuersanger et al. | ......... 370/336 |

OTHER PUBLICATIONS

Extended European Search Report received for European Patent Application No. 11870852.8, mailed Jul. 28, 2015, 7 pages.

Simonsson et al., "Uplink Power Control in LTE—Overview and Performance, subtitle: Principles and Benefits of Utilizing Rather Than Compensating for SINR Variations", IEEE, Vehicular Technology Conference, Sep. 21, 2008, XP031352500, 5 pages.

"Uplink Power Control for Carrier Aggregation in LTE—Advanced", Potevio, 3GPP Draft, R1-100609, XP050418215, Jan. 12, 2010, 3 pages.

Mullner et al., "Enhancing Uplink Performance in UTRAN LTE Networks by Load Adaptive Power Controls", European Transactions on Telecommunications, vol. 21, No. 5, Aug. 1, 2010, XP001557117, 11 pages.

* cited by examiner

SYSTEM AND METHOD OF UPLINK POWER CONTROL IN A WIRELESS COMMUNICATION SYSTEM

This application claims priority to U.S. provisional patent application Ser. No. 61/523,080, filed Aug. 12, 2011, and incorporated by reference herein in its entirety.

BACKGROUND

In wireless communications, the need to arrange communications efficiently continues to grow with the proliferation of new communications network configurations. In heterogeneous network configurations (HetNet) for example, a common network operator may simultaneously manage two different overlapping networks having different coverage areas and/or radio power, in which optimum power levels to be employed for uplink communications may vary between different networks.

At present, the control of uplink power specified by current standards is designed to enhance performance in radio access network (RAN) configurations involving a homogeneous network of macro extended Node B (eNB) base stations that each provide coverage over an area whose radius may extend hundreds or thousands of meters. Such procedures may involve estimating uplink power based upon fraction pathloss (FPC) algorithm. However, uplink power control using the FPC algorithm may be problematic for other network configurations. For example, in many areas, network operators have begun implementing HetNets, which may include additional radio networks besides the conventional network of macro base station, such as eNBs. For example, a HetNet may involve a distributed base station architecture, in which a group of Remote Radio Heads (RRH) installed on towers and buildings are connected via a standardized fiber interface to a central eNB base station. HetNet architecture may additionally or alternatively include a network of low power pico-cells and/or femtocells that are each linked to the central base station. One issue that arises with such a HetNet configuration is that, because of the different downlink transmission power level in the eNB transmitter as compared to the RRH transmitter, the coverage areas are different for downlink and uplink transmissions. The pathloss used in the FPC algorithm accordingly may greatly reduce the uplink throughput in such a HetNet configuration. Accordingly, the FPC-based procedures for determining uplink transmit power may yield less-than-ideal results in a heterogeneous radio network environment provided by the HetNet.

In addition, even in homogenous networks, the FPC algorithm for determining uplink transmit power may result in performance shortcomings.

It is with respect to these and other considerations that the present improvements have been needed.

DETAILED DESCRIPTION

Various embodiments are directed to wireless communications to control uplink power from a wireless terminal, also referred to as user equipment (UE), to a base station (eNB) of a radio access network. Some embodiments of a communications device or system may be implemented with a radio technology such as LTE-advanced (LTE-A), which is an evolution of the 3GPP LTE 3rd generation partnership project (3GPP). Long term evolution (LTE) is a part of an evolved UMTS (E-UMTS) using the E-UTRA. The UTRA is a part of a universal mobile telecommunication system (UMTS). Although some embodiments are described with reference to a particular radio technology by way of example and not limitation, it may be appreciated that the embodiments may be implemented for any radio technology utilizing power control procedures. The embodiments are not limited in this context.

In some embodiments are directed to determining power for uplink transmissions based upon a full pathloss compensation procedure. In various embodiments, the power control procedure used for physical uplink control channel (PUSCH) transmission may be modified to remove the conventional FPC algorithm specified by current LTE standards, and may instead employ full pathloss compensation to determine PUSCH transmit power. The full pathloss compensation procedure may determine optimum uplink transmit power in a manner that avoids the problems encountered in heterogeneous networks when fractional pathloss compensation is applied.

In some embodiments, a new signal-to-interference-and-noise ratio (SINR) parameter may be applied to determine uplink power, which SINR parameter may be determined by an eNodeB for broadcast to UEs within the transmission range of the eNB.

Figure 1:
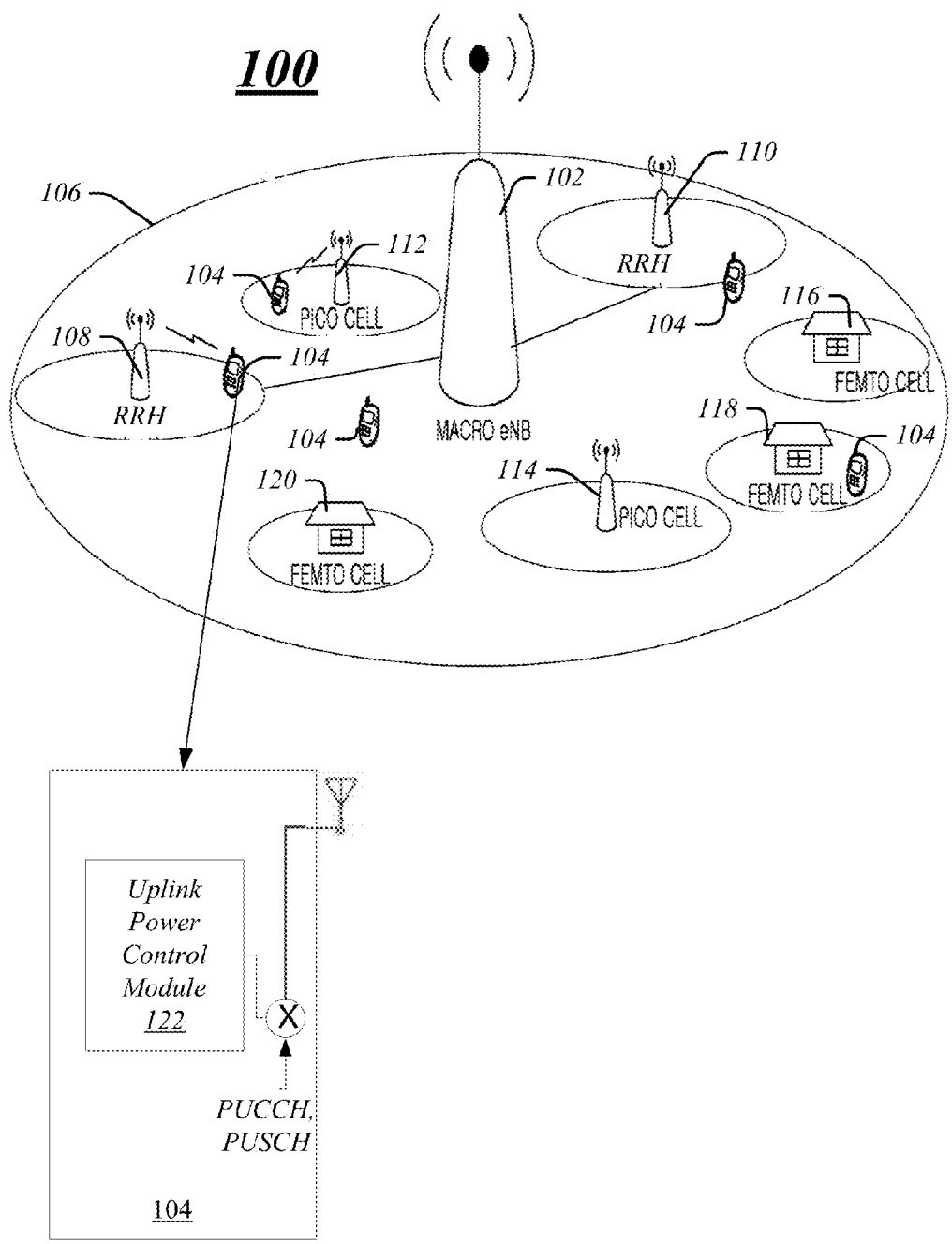
FIG. 1 depicts a scenario for deployment of an exemplary wireless terminal in a heterogeneous network consistent with the present embodiments.

FIG. 1 depicts a scenario for deployment of an exemplary wireless terminal in a heterogeneous network 100 for implementing uplink power control consistent with the present embodiments. As illustrated, the heterogeneous network 100 may include one or more base stations (eNB) 102, which may form part of a radio access network (including multiple eNBs) to provide services to users of a wireless terminal or users equipment (UE) 104 that enter into a coverage area 106. Some embodiments of a UE 104 include a cellular telephone, a smart phone, a tablet computer, a portable computer, a personal digital assistant, a touch screen device or other display device. The heterogeneous network 100 may also include a set of remote radio heads (RRH) such as RRHs 108, 110. The RRHs 108, 110 may be connected to eNB 102 via a wired connection, such as a fiber optic cable. The heterogeneous network 100 may further include a set of pico cell access points, as illustrated by picocell access points 112, 114. The picocell access points 112, 114 may be small wireless base stations having less transmit power than the eNB 102. The heterogeneous network 100 may also include femtocell access points 116, 118, 120, which may also be low power base stations, typically designed for home or small business environments.

To better illustrate the present embodiments, it may be useful to first consider shortcomings of conventional uplink power control when applied to a heterogeneous network scenario, such as that depicted in FIG. 1. In current 3GPP LTE and LTE advanced generations (LTE-A) (R.8, R.9, R10) uplink power control is specified for the physical uplink shared channel (PUSCH) (data channel) based on a Fractional Pathloss Compensation (FPC) algorithm. In particular, a recent LTE release ($3^{rd}$ Generation Partnership Project, Technical Specification 36.213 Group Radio Access Network, section 5.1.1.1; Evolved Universal Terrestrial Radio Access (E-UTRA); (release 10), June 2011) specifies the PUSCH power for a wireless terminal or user equipment (UE) in the cases where the PUSCH is transmitted with or without a simultaneous transmission of a physical uplink control channel for a given serving cell. In particular, when transmitting only the PUSCH the UE transmit power $P_{PUSCH,c}(i)$ for PUSCH transmission in a subframe i for the serving cell c is given by $$P_{PUSCH,c}(i) = \min\begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix} \quad (1)$$

As noted, the LTE release 10 specifies that a PUCCH transmission can take place simultaneously with the transmission of a PUSCH transmission. In the case of simultaneous transmission with the PUCCH, the UE transmit power $P_{PUSCH,c}(i)$ for PUSCH transmission in a subframe i for the serving cell c is given by:

$$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix} \quad (2)$$

In Eqs. (1) and (2), $P_{CMAX,c}(i)$ is the configured UE transmit power in subframe i for serving cell c and $\hat{P}_{CMAX,c}(i)$ is the linear value of $P_{CMAX,c}(i)$. $\hat{P}_{PUCCH}(i)$ is the linear value of $P_{PUCCH}(i)$ defined as:

$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix} \quad (3)$$

The parameter $M_{PUSCH,c}(i)$ is the bandwidth of the PUSCH resource assignment expressed in number of resource blocks valid for subframe i and serving cell c. In addition, $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. The parameter $PL_c$ is the downlink pathloss estimate calculated in the UE for serving cell c in dB.

A central component of Eqs. (1) and (2) is the fractional pathloss compensation (FPC) procedure, which can be expressed by:

$$PSD_{perRB,c} = P_{O\_PUSCH,c} + \alpha_c \cdot PL_c \quad (4)$$

where $PSD_{perRB,c}$ is the transmission power of one resource block (RB) size, $P_{O\_PUSCH,c}$ is the power base value sent by the base station (eNodeB), and $\alpha_c$ is the FPC control parameter that can be 0, 0.4, 0.5, 0.6, 0.7, 0.8, 0.9, 1. The above FPC compensation procedure sets the transmission power to compensate for only a portion of the pathloss, may therefore be beneficial for cell-edge users who generally experience large pathloss and generate significant interference with neighboring cells. By limiting the transmit power via fractional pathloss compensation, entities such as interference-over-thermal noise (IoT) experienced in neighboring cells may be reduced significantly, providing improvements both in cell average and cell-edge user throughput.

The above procedures specified in EQs. (1)-(4) may enhance performance in radio access network (RAN) configurations involving a homogeneous network of macro extended Node B (eNB) base stations that each provide coverage over an area whose radius may extend hundreds or thousands of meters. However, uplink power control using the FPC algorithm may be problematic for other network configurations. For example, in many areas, network operators have begun implementing HetNets, which may include additional radio networks besides the conventional network of macro base station, such as eNBs. For example, a HetNet may involve a distributed base station architecture, in which a group of Remote Radio Heads (RRH) installed on towers and buildings are connected via a standardized fiber interface to a central eNB base station. HetNet architecture may additionally or alternatively include a network of low power pico-cells and/or femtocells that are each linked to the central base station. One issue that arises with HetNet configurations including architecture similar to that of the heterogeneous network 100, is that, because of the different downlink transmission power level in the eNB transmitter as compared to the RRH transmitter, the coverage areas are different for downlink and uplink transmissions. The pathloss used in the FPC algorithm accordingly may greatly reduce the uplink throughput in such a HetNet configuration. Accordingly, the FPC-based procedures specified in EQs. (1)-(4) for determining uplink transmit power may yield less-than-ideal results in a heterogeneous radio network environment provided by the HetNet.

Consistent with the present embodiments, when a UE 104 moves to different locations within the heterogeneous network 100, at a given instance, communications may be scheduled between the UE 104 and any of the base stations/access points of the heterogeneous network 100 using full pathloss compensation techniques. In particular, when scheduling communications between a UE 104 and an eNB 102 or RRH 108, for example, in order to determine the proper PUSCH power, the UE may employ an uplink power control module 122, whose operation is detailed below. Due to the differences in downlink transmission power levels between communications from the eNB 102 compared to communications received from RRH 108, the coverage areas may be different for downlink and uplink communications. In such a scenario, the pathloss used in conventional procedures employing FPC to determine the presence of a cell edge or not may greatly reduce uplink throughput. In various embodiments, this issue is addressed by the uplink power control module 122, which may apply a new power control procedure that employs full pathloss compensation to determine uplink power to be employed in a PUSCH communication by UE 104.

Figure 2:
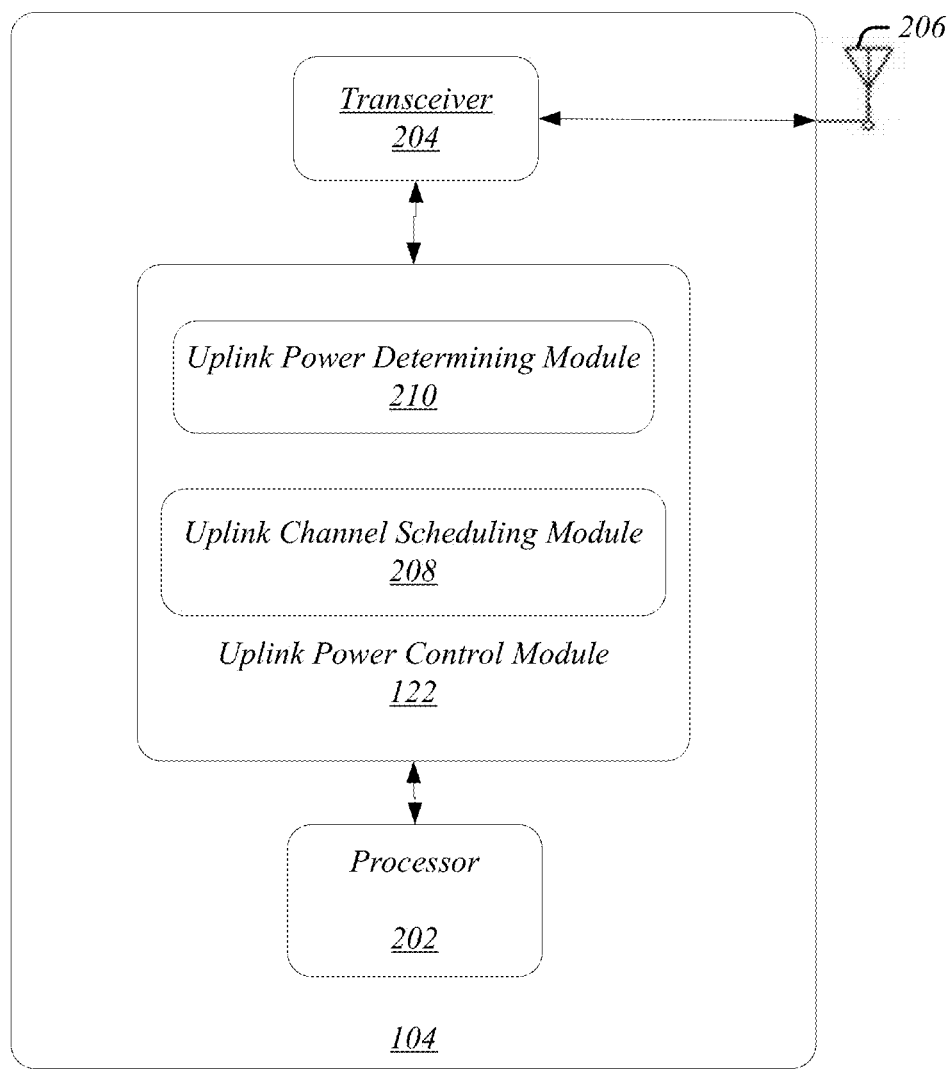
FIG. 2 depicts an embodiment of a wireless terminal consistent with the present embodiments.

FIG. 2 depicts an embodiment of UE 104 in which a processor 202 is coupled to an uplink power control module 122, which may be employed to set the uplink power for PUSCH data transmission as detailed in the FIGs. to follow. The uplink power control module 122 may employ a full pathloss compensation procedure based on parameters received from an eNB. As illustrated, the uplink power control module may contain an uplink channel scheduling module 208 and uplink power determining module 210. The uplink channel scheduling module 208 may determine the structure of transmissions in an uplink sub-frame to be employed by UE 104. For example, the uplink scheduling module 208 may determine whether or not in a given uplink sub-frame a data transmission via PUSCH is to be accompanied by a PUCCH transmission. Once the uplink scheduling has determined if a PUSCH transmission is to take place alone or accompanied with a PUCCH transmission, this information may be forwarded to uplink power determining module 210. As detailed below, the uplink power determining module 210 may employ the information from uplink scheduling module 208 together with signaling information received from its serving cell to set the uplink power to be used during PUSCH transmission. In so doing, the uplink power determining module 210 may employ full pathloss compensation to determine transmit power for UE 104, as opposed to approaches using fractional pathloss compensation. In addition, the uplink power determining module 210 may employ a signal-to-noise-and interference parameter, which may be derived from information received from the eNB of the serving cell, as detailed below.

In accordance with various embodiments, the uplink power determining module 210 may determine UE transmit power as follows. If the UE 104 is to transmit PUSCH without a simultaneous PUCCH for the serving cell c, then the UE transmit power $P_{PUSCH,c}(i)$ for PUSCH transmission in subframe i for the serving cell c is given by $$P_{PUSCH,c}(i) = \min\begin{cases} P_{CMAX,c}(i), \\ 10\log_{10}(M_{PUSCH,c}(i)) + P_{O\_PUSCH,c}(j) + PL_c + SINR_{opt,c}(j) + \Delta_{TF,c}(i) + f_c(i) \end{cases}. \quad (5)$$

If the UE transmits PUSCH simultaneous with PUCCH for the serving cell c, then the UE transmit power $P_{PUSCH,c}(i)$ for the PUSCH transmission in subframe i for the serving cell c is given by $$P_{PUSCH,c}(i) = \min\begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + PL_c + SINR_{opt,c}(j) + \Delta_{TF,c}(i) + f_c(i) \end{cases}. \quad (6)$$

As is evident from inspection of Eqs. (5) and (6), the procedures embodied therein involve many of the parameters specified by respective Eqs. (1) and (2) above, which set forth the UE uplink transmit power procedures specified by LTE standard Release 10. However, Eqs. (5) and (6) specify a full pathloss compensation procedure rather than the fractional pathloss compensation procedure of Eqs. (1) and (2). Additionally, the Eqs. (5) and (6) introduce a parameter $SINR_{opt,c}(j)$, which represents an SINR value derived from a minimum expected cell edge SINR, and may be used to achieve optimum uplink performance. Consistent with various embodiments, the $SINR_{opt,c}(j)$ may be calculated by the uplink power determining module 210, as described below.

In some embodiments, $SINR_{opt,c}(j)$ may be derived from a signal-to-noise parameter calculated by a base station of the serving cell for a UE at a given instance. The parameter j may denote one of three PUSCH transmission types corresponding to j=0, 1, 2. For transmissions corresponding to a semi-persistent grant, j=0. For transmissions corresponding to a dynamic scheduled grant j=1, while for transmissions corresponding to a random access response j=2. Turning once more to FIG. 1, a base station, such as eNB 102, may measure radio signals in its environment, including noise and interference, in order to calculate an SINR parameter to be used by the UE 104 to determine transmit power to be used in an uplink PUSCH transmission. In particular, based upon its measurements, the eNB 102 may determine a parameter $SINR_{MIN,c}(dB)$ that represents the minimum expected cell edge SINR value for serving cell c. The value of $SINR_{MIN,c}(dB)$ may then be transmitted to UE 104, which may use the received $SINR_{MIN,c}(dB)$ value to calculate $SINR_{opt,c}(j)$ as follows:

$$SINR_{opt,c}(j) = \quad (7)$$
$$10\log10\left(\max\left(10^{\wedge}\left(\frac{SINR_{MIN,c}(\text{dB})}{10}\right), \alpha_c(j) \cdot CINR_{DL,c} - \frac{1}{N_{r,c}}\right)\right).$$

In the Eq. (7), the term $\alpha_c(j)$ is a fairness adjustment value for the serving cell c, which may be decided by eNodeB 102 for fairness and interference-over-thermal noise (IoT) control. The latter factor represent the interference perceived at a cell normalized to the thermal noise level.

The term $N_r$ refers to the number of receiving antenna in eNodeB for the serving cell c, while the parameter $CINR_{DL,c}$ refers to the carrier-to-interference-and-noise ratio, which denotes the ratio of power of the downlink carrier bearing the desired downlink signal to the total power of interfering signals and noise. In particular, the parameter $CINR_{DL,c}$ represents the downlink CINR measured value reported by a UE, such as UE 104 for the serving cell c.

Thus, once the eNB 102 transmits a current $SINR_{MIN,c}(\text{dB})$ value to the UE 104, the current value of $SINR_{opt,c}(j)$ can be determined by the UE 104 as shown above. After determining whether a subsequent PUSCH transmission is to be accompanied by a PUCCH transmission, this optimal SINR value $SINR_{opt,c}(j)$ may then be used to determine the appropriate PUSCH transmit power as set forth in the alternative Eqs. (5) or (6).

The above Eq. (7) may be considered an optimal solution that may yield a best performance in principle. However, in another embodiment, a simpler procedure may be employed to determine $SINR_{opt,c}(j)$. In the simpler procedure, $SINR_{opt,c}(j)$ may be determined as $$SINR_{opt,c}(j) = \quad (8)$$
$$\begin{cases} \max(SINR_{MIN,c}(\text{dB}), 10\log10(\alpha_c(j)) + CINR_{DL,c}(\text{dB})), & \text{if } \alpha_c(j) \neq 0 \\ SINR_{MIN,c}(\text{dB}), & \text{if } \alpha_c(j) = 0. \end{cases}$$

The determination of $SINR_{opt,c}(j)$ using Eq. (8) may yield performance that is slightly less than when Eq. (7) is used to determine $SINR_{opt,c}(j)$; however, the algorithm defined in Eq. (7) may be simpler to implement.

Figure 3:
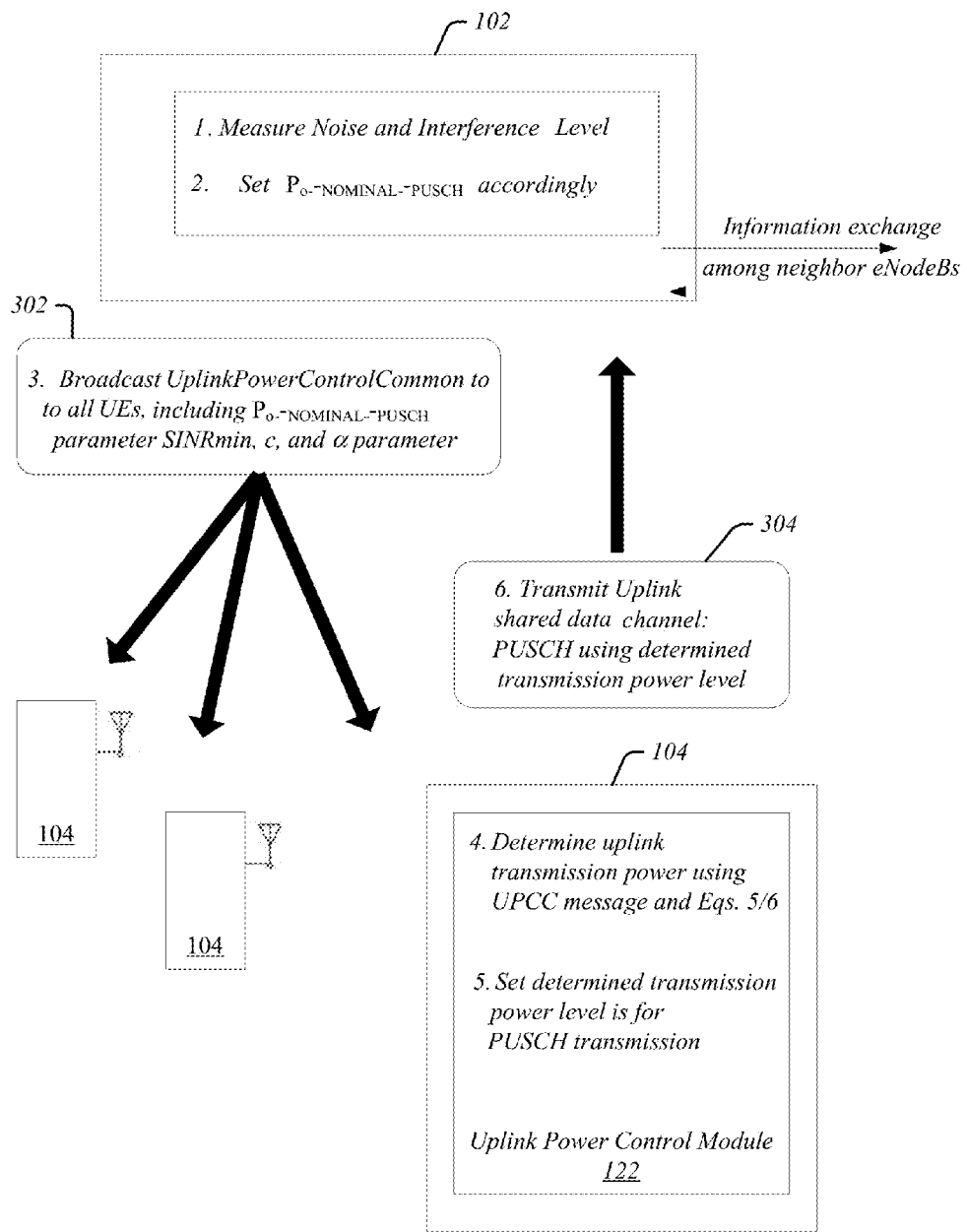
FIG. 3 depicts exemplary signaling between a base station and wireless terminal consistent with various embodiments.

FIG. 3 depicts a scenario showing exemplary signaling between a base station and mobile terminal consistent with various embodiments. As illustrated, a of actions may be performed beginning with actions taken by an eNB 102 in a serving cell for UE 104. As illustrated, the eNB 102 may perform measurements to determine noise and interference levels in its vicinity. The eNB 102 may then set $SINR_{MIN,c}$ (dB) and may set a parameter $P_{o\text{-}NOMINAL\text{-}PUSCH}$, which is a cell-specific parameter provided by higher layers and is related to $P_{o\text{-}PUSCH}$ as follows:

$$P_{o\text{-}PUSCH}(j) = P_{o\text{-}NOMINAL\text{-}PUSCH}(j) + P_{o\text{-}UE\text{-}PUSCH}(j) \quad (9)$$

where $P_{o\text{-}NOMINAL\text{-}PUSCH}(j)$ is a UE-specific parameter provided by Radio Resource Control (RRC) signaling.

Consistent with present embodiments, the parameter $P_{o\text{-}NOMINAL\text{-}PUSCH}(j)$ may be set as:

$$P_{O\_NOMINAL\_PUSCH,c}(j) = \text{Quantization}(NI) \quad (10).$$

In Eq. (10), NI represents the average power level (dBm) of the noise and interference per resource block (RB) as measured at the eNB. In various embodiments, the Quantization function of Eq. (10) may quantize the NI value into multiple different levels characterized by small dBm increments. In one example, quantization may proceed in 1 dBm steps in a range of −126 to −24 dBm.

After determining $SINR_{MIN,c}(\text{dB})$ and $P_{o\text{-}NOMINAL\text{-}PUSCH}(j)$, the eNB may also determine the fairness parameter $\alpha_c(j)$, as defined above. Subsequently, as illustrated in FIG. 3, the eNB 102 may send an information element UplinkPowerControlCommon in the form of a broadcast message 302, which may be a MAC message, and may include the parameters $SINR_{MIN,c}(\text{dB})$, $P_{o\text{-}NOMINAL\text{-}PUSCH}(j)$, and $\alpha_c(j)$. The broadcast message 302 may be received by any UE 104 that is within a broadcast range of the eNB 102, as shown. When a UE 104 receives the broadcast message 302, the uplink power control module 122 may process information contained therein to determine uplink transmit power. As shown in FIG. 3, the uplink power control module 122 may determine uplink transmission power using information received in the UplinkPowerControlCommon message in conjunction with the procedures specified by the Eqs. (5) or (6). Thus, the uplink power control module 122 may use the value of $P_{o\text{-}NOMINAL\text{-}PUSCH}(j)$ received from eNB 102 to determine $P_{o\text{-}PUSCH}(j)$ using the procedure of Eq. (9). The calculated value of parameter $P_{o\text{-}PUSCH}(j)$ and the values of $SINR_{MIN,c}(\text{dB})$ and $\alpha_c(j)$ received from eNB 102 may be substituted into Eqs. (5) or (6) to determine $P_{PUSCH,c}(i)$. The determined value of power level may then be set as the $P_{PUSCH,c}(i)$ for subsequent uplink PUSCH transmission(s). Subsequently, during the appropriate uplink subframe(s), the PUSCH data may be transmitted by UE 104 at the determined uplink power level $P_{PUSCH,c}(i)$. In addition, to improve performance, radio measurements or other information may be exchanged between neighboring eNBs.

Figure 4:
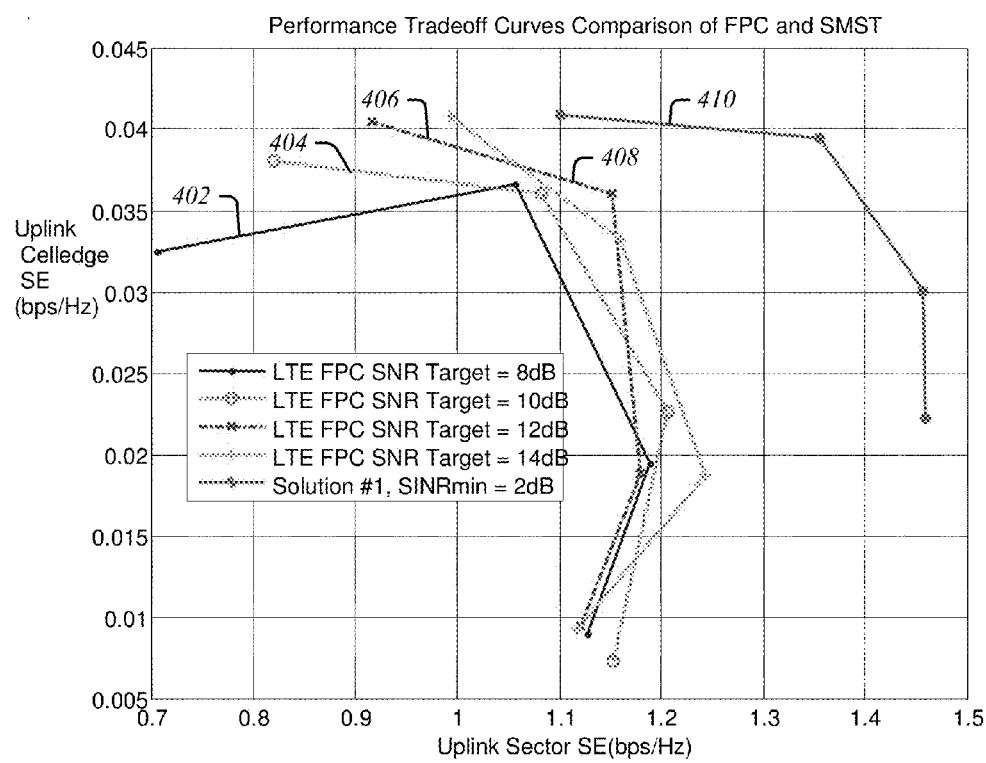
FIG. 4 presents results of simulations that compare performance metric values provided by conventional uplink FPC-based power control procedures to performance metric values provided by present embodiments.

In accordance with the present embodiments, various performance parameters may be enhanced over standard uplink power schemes, such as those specified in Eqs. (1) and (2). FIG. 4 presents results of simulations that illustrate one type of performance metric in which the cell edge spectral efficiency (SE) is plotted as a function of the uplink sector SE for five different conditions. The four curves 402, 404, 406, and 408 correspond to conventional procedures for determining power $P_{PUSCH,c}(i)$ power as set forth in Eqs. (2) and (3) above, while the fifth curve 410 reflects the results of PUSCH power determination according to the present embodiments as set forth in Eq. (5). In particular, the $SINR_{MIN}$ is set for 2 dB for the PUSCH power scenario illustrated by curve 410. The parameters used to produce the curves 402, 404, 406, and 408 differ among one another only in the target SNR value, which ranges from 8-14 dB as illustrated. As evident from FIG. 4, all the curves exhibit a cell edge SE value in a similar range of 0.03-0.04 for lower values of uplink sector SE (<1). It is also evident that increasing the target SNR value to higher dB levels as demonstrated by the progression in curves 402, 404, 406, and 408, has only a modest effect on the SE behavior. However, when the uplink sector SE exceeds about 1.1 bps/Hz the cell edge SE plunges toward zero for all dB levels of the SNR. In contrast, curve 410 (SINR=2 dB), maintains a cell edge SE value of about 0.04 up to uplink sector SE values of about 1.4.

Figure 5:
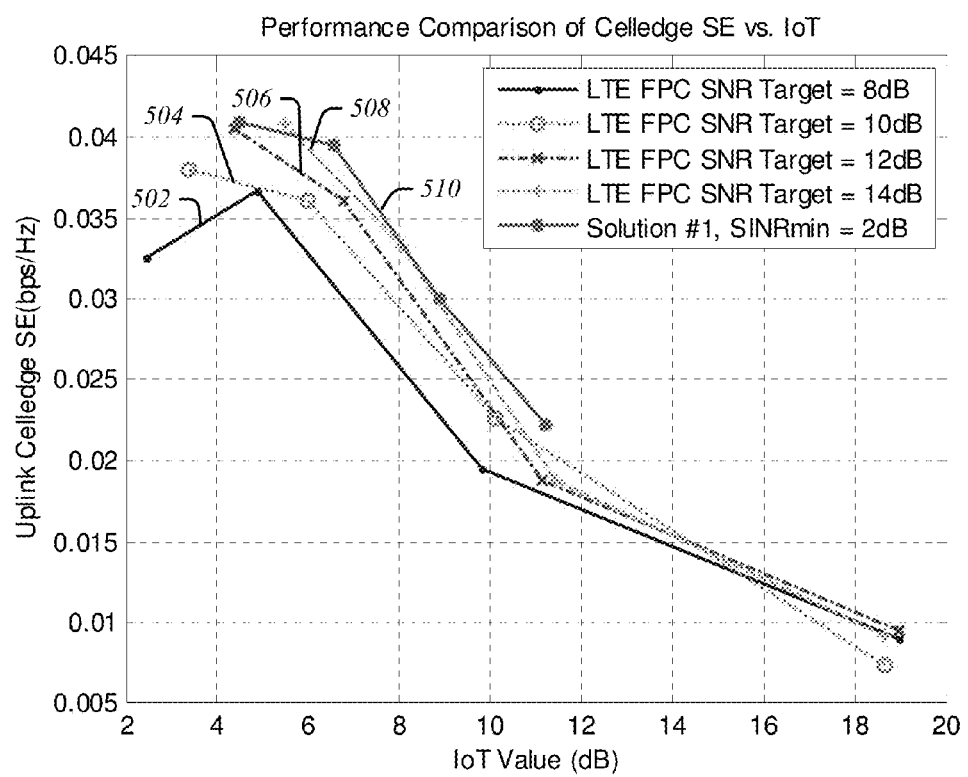
FIG. 5 provides a comparison of values produced by another combination of performance metrics using conventional FPC-based techniques compared to values produced by the present embodiments for the same set of conditions illustrated in FIG. 4.

FIG. 5 provides a further performance comparison using additional performance metrics for the same set of simulated conditions illustrated in FIG. 4. In particular, FIG. 5 depicts uplink cell edge SE as a function of the interference-over-thermal noise (IoT) parameter. As illustrated, curve 502, corresponds to the same simulated conditions as curve 402, curve 504 corresponds to the same simulated conditions as curve 404, and so forth. Thus, curves 502, 504, 506, and 508 are simulated curves based on the procedures for determining $P_{PUSCH}$ set forth in the conventional Eqs. (1) and (2), while curve 510 illustrates the results of simulations for determining $P_{PUSCH}$ in accordance with the present embodiments. For the conventional simulations, at IoT values below about 10 dB, the uplink cell edge SE increases in a moderate fashion with increasing SNR target values from 8 dB to 14 dB. Curve 510, determined by simulation according to Eqs. (5), presents for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
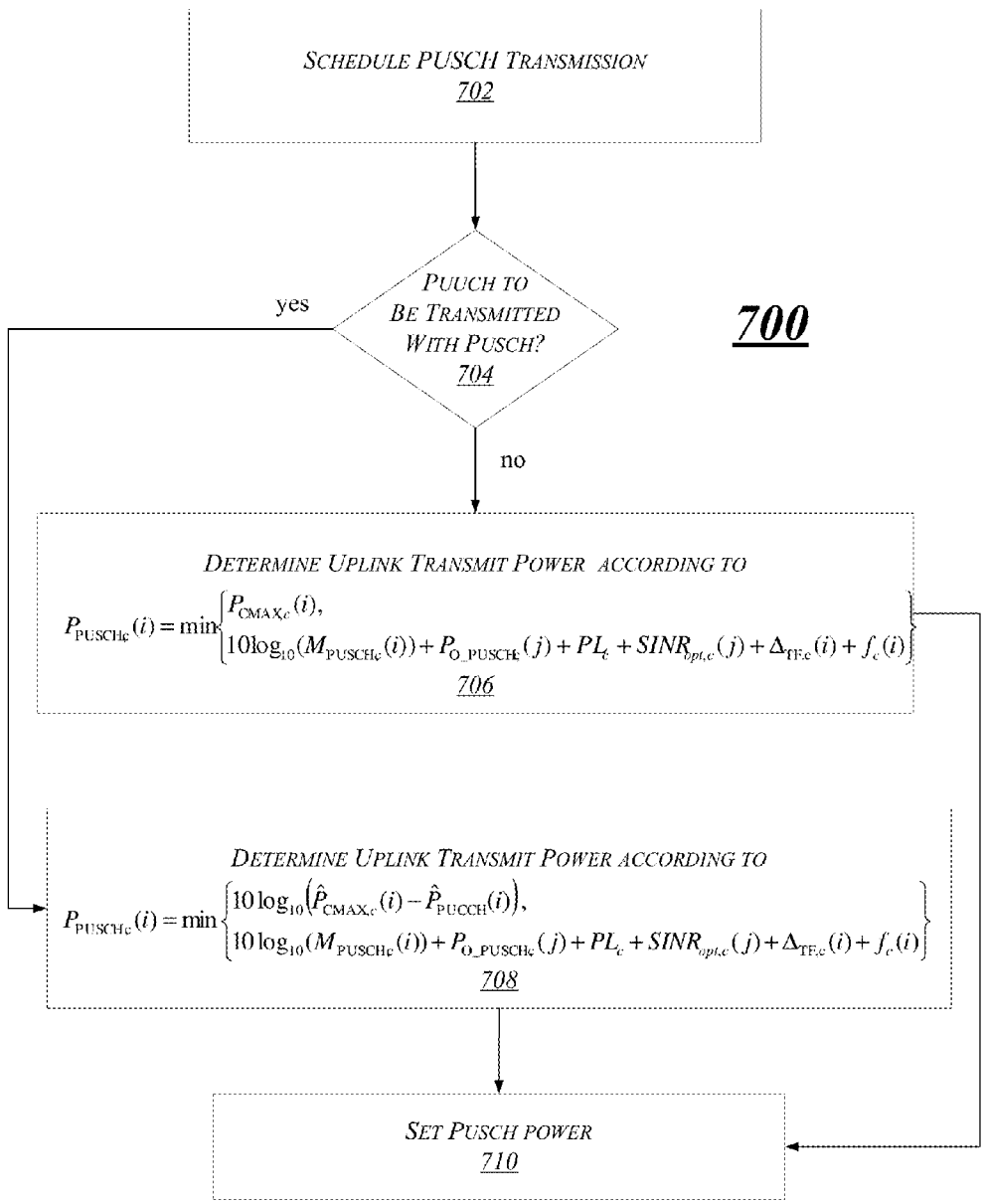
FIG. 7 illustrates an exemplary logic flow consistent with some embodiments.

FIG. 7 illustrates an exemplary logic flow 700. At block 702, a PUSCH transmission is scheduled. At block 704, a determination is made as to whether a PUUCH is to be transmitted with the scheduled PUSCH transmission. If, at block 704, a PUUCH is to be transmitted with the scheduled PUSCH transmission, the flow moves to block 708. At block 708, the uplink PUSCH power is determined according to $$P_{PUSCH,c}(i) = \min\left\{ \begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + PL_c + SINR_{opt,c}(j) + \Delta_{TF,c}(i) + f_c(i) \end{array} \right\}.$$

the results for the $SINR_{MIN}$ value of 2 dB, as in the curve 410. In this case, at IoT values below about 10 dB, the uplink cell edge SE is (marginally) higher than that of the conventional curves 502-508.

If, at block 704, a determination is made that no PUUCH is to be transmitted with the PUSCH, the flow proceeds to block 706. At block 706, the uplink PUSCH power is determined according to $$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + PL_c + SINR_{opt,c}(j) + \Delta_{TF,c}(i) + f_c(i) \end{array} \right\}.$$

Figure 6:
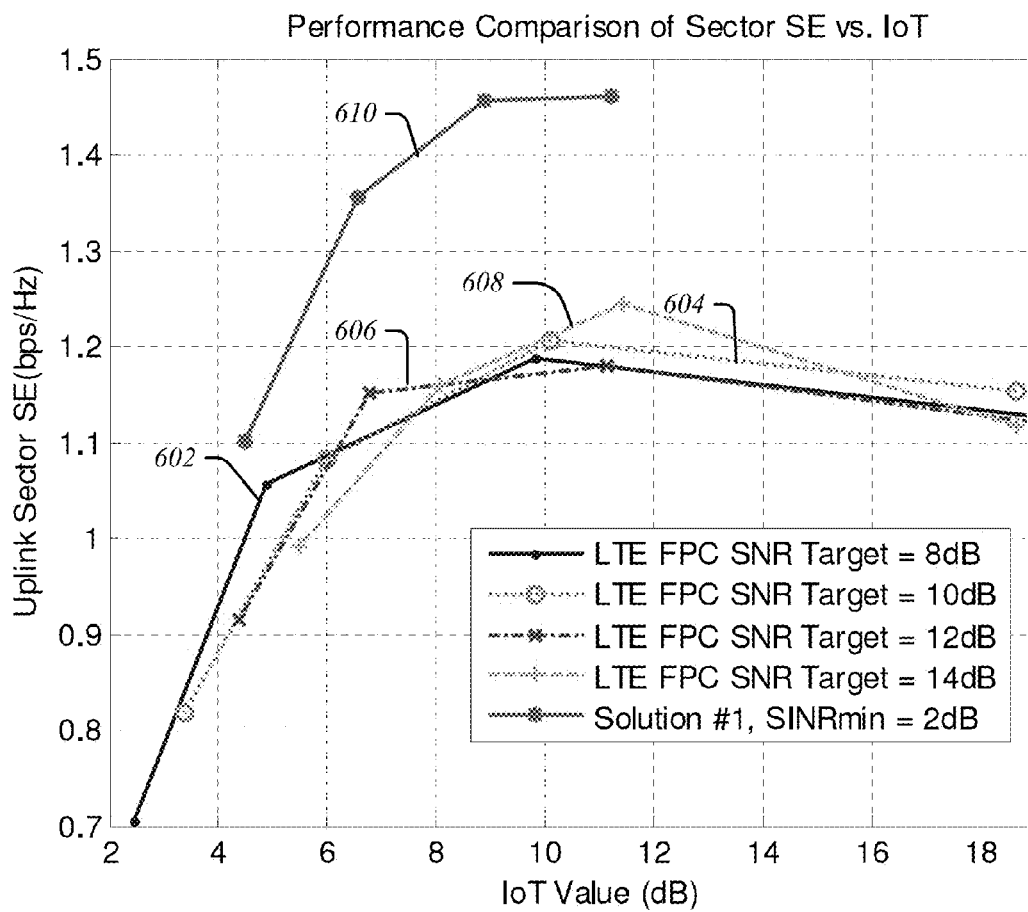
FIG. 6 provides a further performance metric comparison between FPC-based techniques and the present embodiments using another combination of performance metrics for the same set of simulated conditions illustrated in FIGS. 4 and 5.

FIG. 6 provides a further performance comparison using another combination of performance metrics for the same set of simulated conditions illustrated in FIGS. 4 and 5. In particular, FIG. 6 depicts uplink sector SE as a function of the interference-over-thermal noise (IoT) parameter. As illustrated, curve 602 corresponds to the same simulated conditions as curves 402, 502; curve 604 corresponds to the same simulated conditions as curves 404, 504; and so forth. Thus, curves 602, 604, 606, and 608 are simulated curves based on the procedures for determining $P_{PUSCH}$ set forth in the conventional Eqs. (1) and (2), while curve 610 illustrates the results of simulations for determining $P_{PUSCH}$ in accordance with the present embodiments. As illustrated in FIG. 6, for the simulations of conventional PUSCH power determination, increasing SNR target values from 8 dB to 14 dB has little systematic effect on uplink sector SE and the maximum uplink sector value is about 1.2 bps/Hz. On the other hand, the simulation according to the present embodiments illustrated by curve 610 produces a substantially higher uplink sector SE value at all values of IoT.

After block 706 or block 708, the flow moves to block 710, where the appropriate determined PUSCH power is set.

Figure 8:
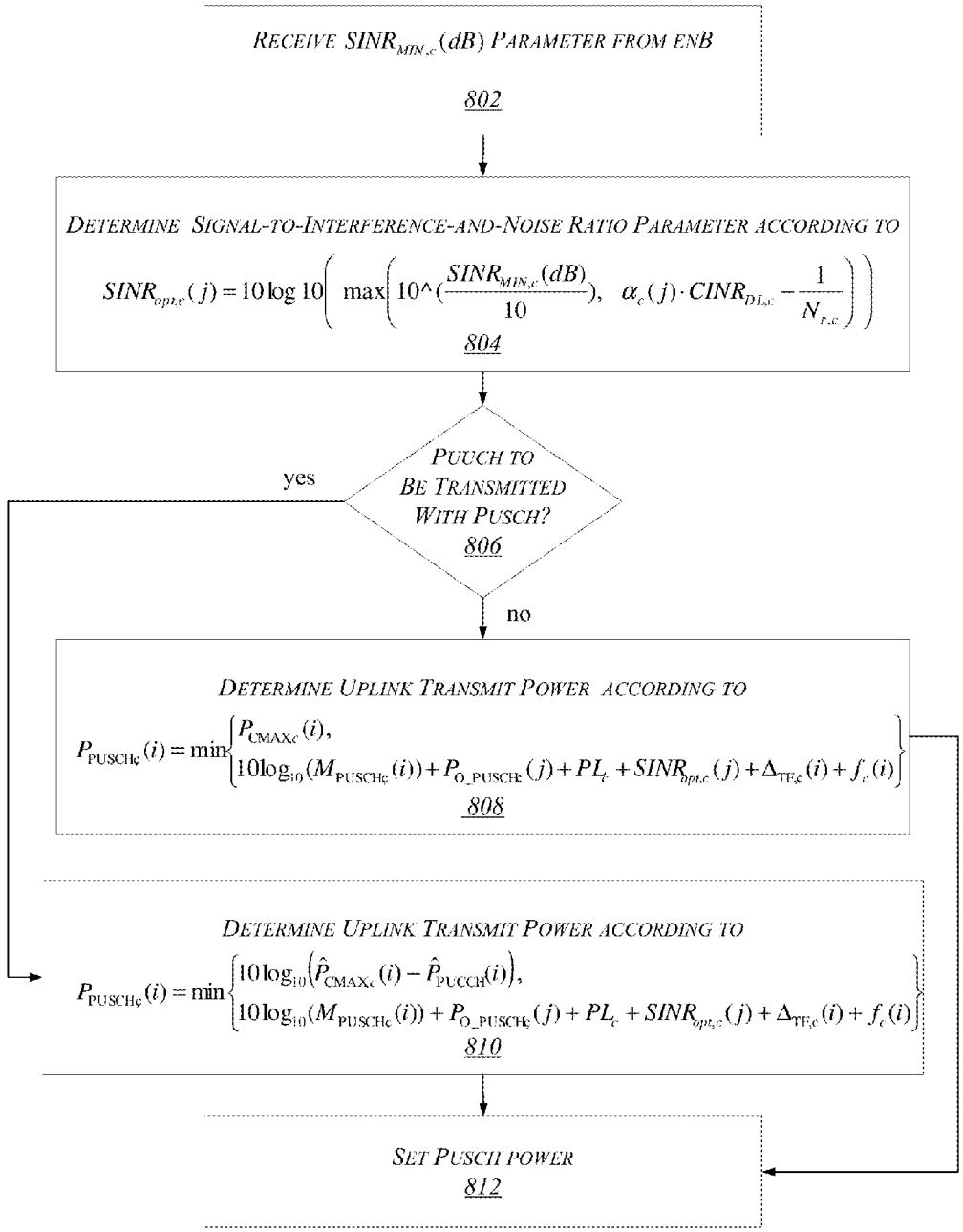
FIG. 8 depicts another logic flow consistent with further embodiments.

FIG. 8 illustrates another exemplary logic flow 800. At block 802, an $SINR_{MIN,c}(dB)$ parameter is received from a base station (eNB). At block 804, a signal-to-interference-and-noise ratio is determined according to:

$$SINR_{opt,c}(j) = 10\log10\left(\max\left(10^{\wedge}\left(\frac{SINR_{MIN,c}(dB)}{10}\right), \alpha_c(j) \cdot CINR_{DL,c} - \frac{1}{N_{r,c}}\right)\right).$$

At block 806, a determination is made as to whether a PUUCH is to be transmitted with the scheduled PUSCH transmission. If, at block 806, a PUUCH is to be transmitted with the scheduled PUSCH transmission, the flow moves to block 810. At block 810, the uplink PUSCH power is determined according to $$P_{PUSCH,c}(i) = \min\left\{ \begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + PL_c + SINR_{opt,c}(j) + \Delta_{TF,c}(i) + f_c(i) \end{array} \right\}.$$

Included herein is a set of flow charts representative of exemplary methodologies for performing novel aspects of the disclosed architecture. While, for purposes of simplicity of explanation, the one or more methodologies shown herein, If, at block 806, a determination is made that no PUUCH is to be transmitted with the PUSCH, the flow proceeds to block 808. At block 808, the uplink PUSCH power is determined according to $$P_{PUSCH,c}(i) = \min\begin{cases}P_{CMAX,c}(i), \\ 10\log_{10}(M_{PUSCH,c}(i)) + P_{O\_PUSCH,c}(j) + PL_c + SINR_{opt,c}(j) + \Delta_{TF,c}(i) + f_c(i)\end{cases}.$$

After blocks 808 or 810, the flow moves to block 812, where the appropriate determined PUSCH power is set.

Figure 9:
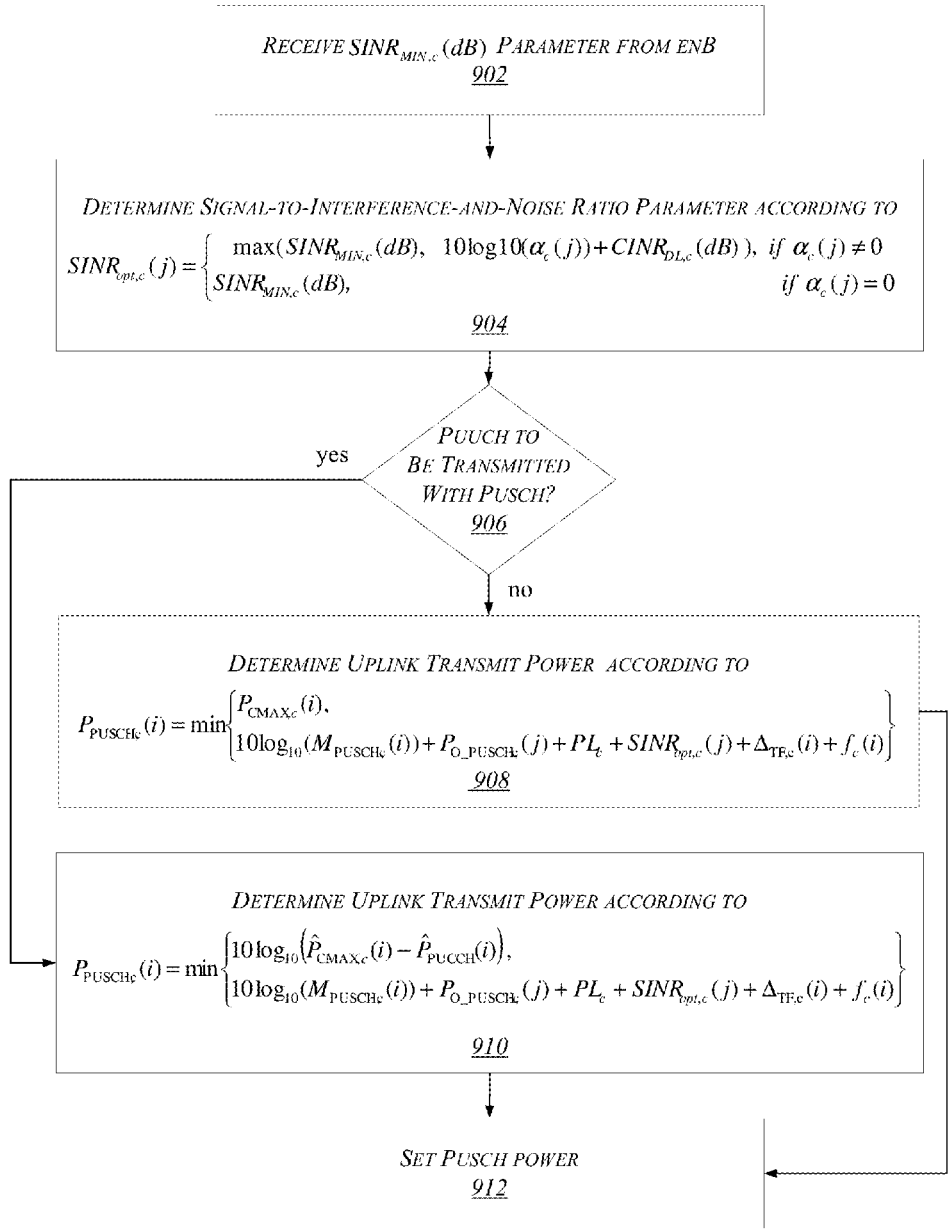
FIG. 9 depicts still another logic flow consistent with further embodiments.

FIG. 9 depicts still another logic flow 900 consistent with further embodiments. At block 902, an $SINR_{MIN,c}$(dB) parameter is received from a base station (eNB). At block 904, a signal-to-interference-and-noise ratio is determined according to:

$$SINR_{opt,c}(j) = \begin{cases}\max(SINR_{MIN,c}(dB), 10\log 10(\alpha_c(j)) + CINR_{DL,c}(dB)), & \text{if } \alpha_c(j) \neq 0 \\ SINR_{MIN,c}(dB), & \text{if } \alpha_c(j) = 0.\end{cases}$$

At block 906, a determination is made as to whether a PUUCH is to be transmitted with the scheduled PUSCH transmission. If, at block 906, a PUUCH is to be transmitted with the scheduled PUSCH transmission, the flow moves to block 910. At block 910, the uplink PUSCH power is determined according to $$P_{PUSCH,c}(i) = \min\begin{cases}10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + PL_c + SINR_{opt,c}(j) + \Delta_{TF,c}(i) + f_c(i)\end{cases}.$$

If, at block 906, a determination is made that no PUUCH is to be transmitted with the PUSCH, the flow proceeds to block 908. At block 908, the uplink PUSCH power is determined according to $$P_{PUSCH,c}(i) = \min\begin{cases}P_{CMAX,c}(i), \\ 10\log_{10}(M_{PUSCH,c}(i)) + P_{O\_PUSCH,c}(j) + PL_c + SINR_{opt,c}(j) + \Delta_{TF,c}(i) + f_c(i)\end{cases}.$$

After blocks 908 or 910, the flow moves to block 912, where the appropriate determined PUSCH power is set.

Figure 10:
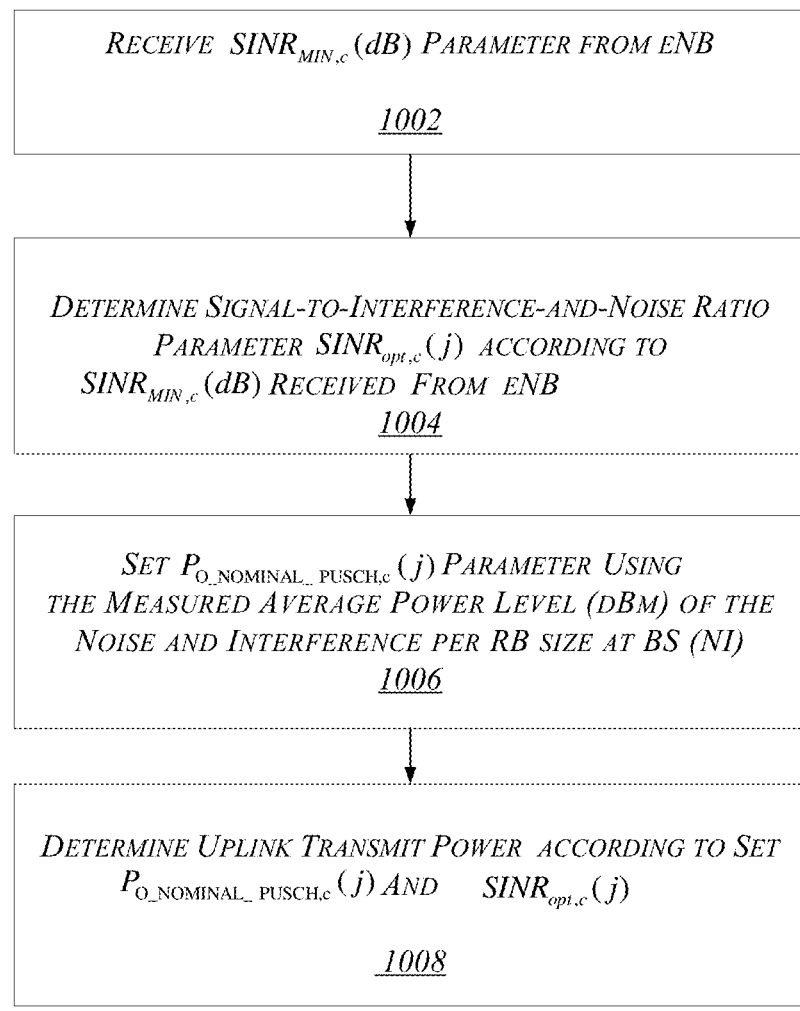
FIG. 10 depicts a further logic flow consistent with further embodiments.

FIG. 10 depicts still another logic flow 1000 consistent with further embodiments. At block 1002, an $SINR_{MIN,c}$(dB) parameter is received from a base station (eNB). At block 1004, a signal-to-noise-and-interference ratio $SINR_{opt,c}$(j) is determined according to the received $SINR_{MIN,c}$(dB).

At block 1006, a parameter $P_{O\_NOMINAL\_PUSCH,c}$(j) is set using the measured average power level NI of the noise and interference per resource block at the base station.

At block 1008, the uplink transmit power is determined according to the set $P_{O\_NOMINAL\_PUSCH,c}$(j) and the $SINR_{opt,c}$(j).

Figure 11:
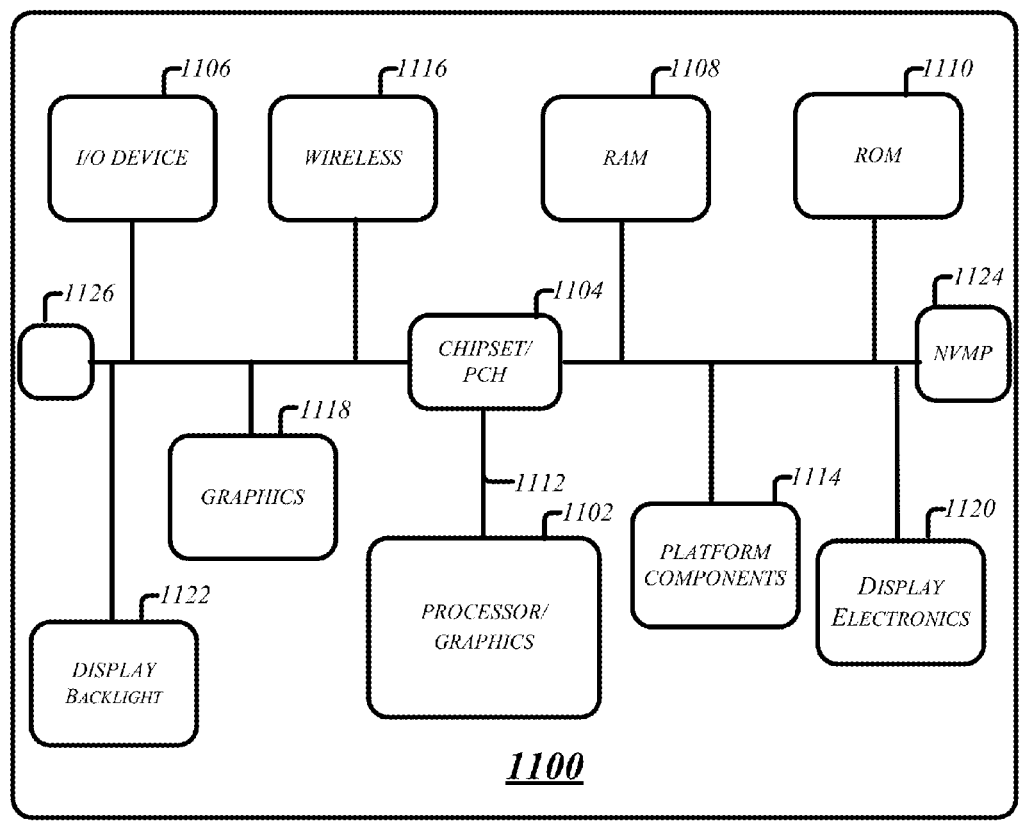
FIG. 11 is a diagram of an exemplary system embodiment.

FIG. 11 is a diagram of an exemplary system embodiment and in particular, FIG. 11 is a diagram showing a platform 1100, which may include various elements. For instance, FIG. 11 shows that platform (system) 1110 may include a processor/graphics core 1102 which may include an applications processor, a chipset/platform control hub (PCH) 1104, an input/output (I/O) device 1106, a random access memory (RAM) (such as dynamic RAM (DRAM)) 1108, and a read only memory (ROM) 1110, display electronics 1120, display backlight 1122, non-volatile memory port (NVMP) 1124, antenna 1126, and various other platform components 1114 (e.g., a fan, a crossflow blower, a heat sink, DTM system, cooling system, housing, vents, and so forth). System 1100 may also include wireless communications chip 1116 and graphics device 1118. The display electronics may include a liquid crystal display (LCD) screen, touch screen display, or other display. The I/O device 1106 may include a keyboard, mouse, and/or speakers. The embodiments, however, are not limited to these elements.

As shown in FIG. 11, I/O device 1106, RAM 1108, and ROM 1110 are coupled to processor 1102 by way of chipset 1104. Chipset 1104 may be coupled to processor 1102 by a bus 1112. Accordingly, bus 1112 may include multiple lines.

Processor 1102 may be a central processing unit comprising one or more processor cores and may include any number of processors having any number of processor cores. The processor 1102 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1102 may be multiple separate processors located on separate integrated circuit chips. In some embodiments processor 1102 may be a processor having integrated graphics, while in other embodiments processor 1102 may be a graphics core or cores.

Figure 12:
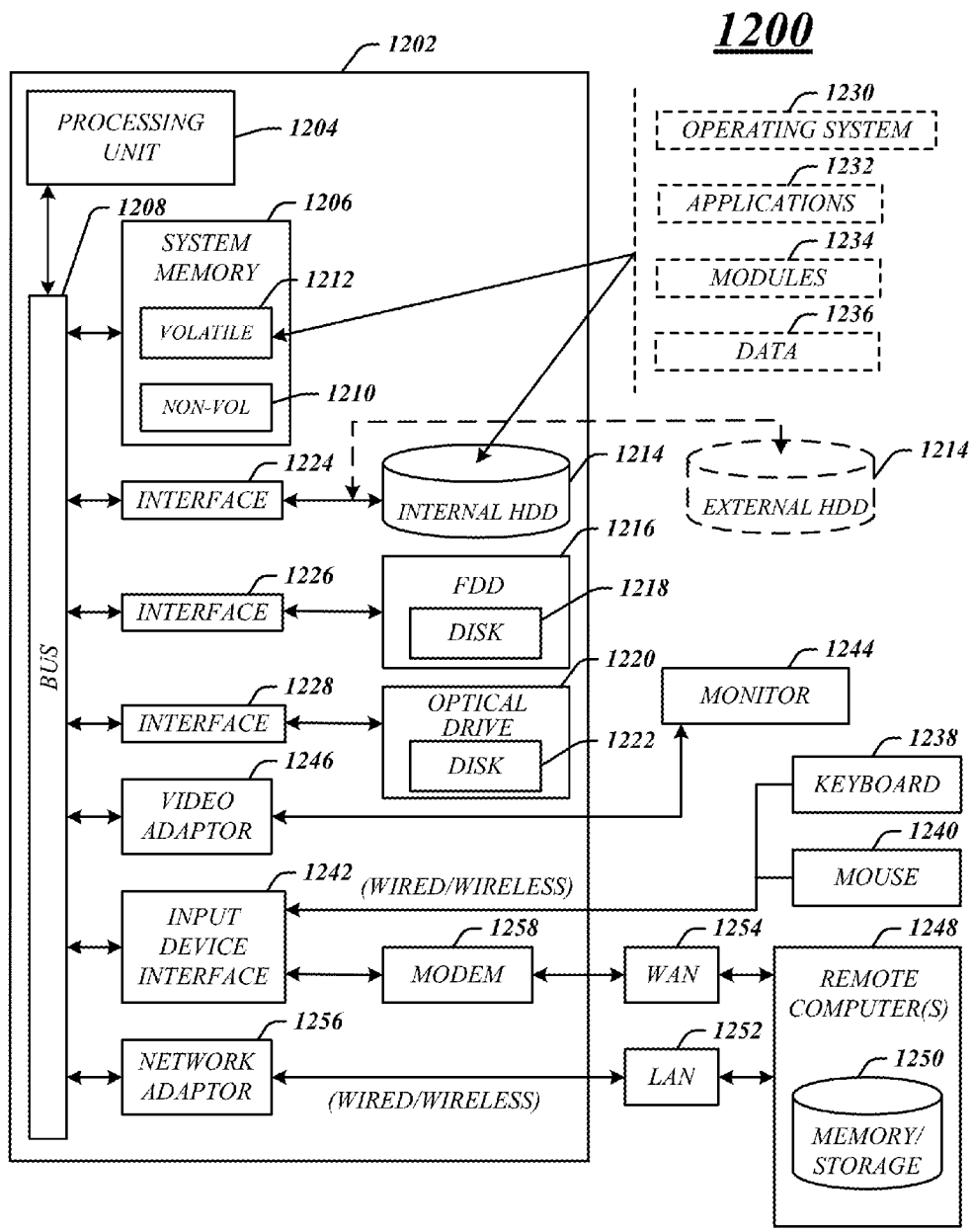
FIG. 12 illustrates an embodiment of an exemplary computing architecture.

FIG. 12 illustrates an embodiment of an exemplary computing architecture 1200 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1200 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1200 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors. Dual microprocessors and other multi processor architectures may also be employed as the processing unit 1204. The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures.

The computing architecture 1200 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media in the form of one or more lower speed memory units, including an internal hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM or DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1194 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236.

A user can enter commands and information into the computer 1202 through one or more wire/wireless input devices, for example, a keyboard 1238 and a pointing device, such as a mouse 1240. Other input devices may include a microphone, an infra-red (IR) remote control, a joystick, a game pad, a stylus pen, touch screen, or the like. These and other input devices are often connected to the processing unit 1204 through an input device interface 1242 that is coupled to the system bus 1208, but can be connected by other interfaces such as a parallel port, IEEE 1194 serial port, a game port, a USB port, an IR interface, and so forth.

A monitor 1244 or other type of display device is also connected to the system bus 1208 via an interface, such as a video adaptor 1246. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a transceiver operable to receive a downlink message from a base station for a serving cell, the downlink message allocating a set of control parameters;
a processor circuit communicatively coupled to the transceiver; and
an uplink power control module operable on the processor circuit to:
read the set of control parameters;
apply a signal-to-noise-and-interference (SINR) parameter based on the received set of control parameters to determine physical uplink shared channel (PUSCH) power to be applied for a PUSCH transmission, the SINR parameter determined from a received control parameter that denotes a minimum expected cell edge SINR value for the serving cell;
determine whether a physical uplink control channel (PUCCH) transmission is to accompany the PUSCH transmission; and
set the PUSCH power according to whether the PUCCH transmission is to accompany the PUSCH transmission.

2. The apparatus of claim 1, the uplink power control module operable on the processor circuit to determine PUSCH power by applying full pathloss compensation.

3. The apparatus of claim 1, the uplink power control module operable on the processor to determine the PUSCH power for a subframe i and serving cell c according to:

$$P_{PUSCH,c}(i) = \min\begin{cases} P_{CMAX,c}(i), \\ 10\log_{10}(M_{PUSCH,c}(i)) + P_{O\_PUSCH,c}(j) + PL_c + SINR_{opt,c}(j) + \Delta_{TF,c}(i) + f_c(i) \end{cases}$$

when no PUCCH transmission is to accompany the PUSCH transmission, where $P_{PUSCH,c}(i)$ represents the PUSCH power for the subframe i and the serving cell c, $P_{CMAX,c}(i)$ represents a configured user equipment (UE) transmit power for the subframe i and the serving cell c, $M_{PUSCH,c}(i)$ represents a bandwidth, in resource blocks, of a PUSCH resource assignment for the subframe i and the serving cell c, j represents a PUSCH transmission type, $P_{o\_PUSCH,c}(j)$ represents a power base value for the PUSCH transmission type j, $PL_c$ represents a downlink pathloss estimate for the serving cell c, $SINR_{opt,c}(j)$ represents the SINR parameter, $\Delta_{TF,c}(i)$ represents an adjustment for a data rate for the subframe i and the serving cell c, and $f_c(i)$ represents a PUSCH power control adjustment state for the subframe i and the serving cell c.

4. The apparatus of claim 1, the uplink power control module operable on the processor to determine the PUSCH power for a subframe i and serving cell c according to:

$$P_{PUSCH,c}(i) = \min\begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + PL_c + SINR_{opt,c}(j) + \Delta_{TF,c}(i) + f_c(i) \end{cases}$$

when PUCCH transmission is to accompany the PUSCH transmission, where $P_{PUSCH,c}(i)$ represents the PUSCH power for the subframe i and the serving cell c, $\hat{P}_{CMAX,c}(i)$ represents a linear value of a configured user equipment (UE) transmit power for the subframe i and the serving cell c, $\hat{P}_{PUCCH}(i)$ represents linear value of a PUCCH transmit power for the subframe i, $P_{PUSCH,c}(i)$ represents a bandwidth, in resource blocks, of a PUSCH resource assignment for the subframe i and the serving cell c, j represents a PUSCH transmission type, $P_{o\_PUSCH,c}(j)$ represents a power base value for the PUSCH transmission type j, $PL_c$ represents a downlink pathloss estimate for the serving cell c, $SINR_{opt,c}(j)$ represents the SINR parameter, $\Delta_{TF,c}(i)$ represents an adjustment for a data rate for the subframe i and the serving cell c, and $f_c(i)$ represents a PUSCH power control adjustment state for the subframe i and the serving cell c.

5. The apparatus of claim 1, the uplink power control module operable on the processor circuit to determine the SINR parameter according to:

$$SINR_{opt,c}(j) = 10\log 10\left(\max\left(10^{\wedge}\left(\frac{SINR_{MIN,c}(dB)}{10}\right), \alpha_c(j) \cdot CINR_{DL,c} - \frac{1}{N_{r,c}}\right)\right),$$

where $SINR_{opt,c}(j)$ represents the SINR parameter, c represents the serving cell, j represents a PUSCH transmission type, $SINR_{MIN,c}$(dB) represents the received control parameter, $\alpha_c(j)$ represents a fairness adjustment value for the serving cell c and the PUSCH transmission type j, $CINR_{DL,c}$ represents a downlink (DL) carrier-to-interference-and-noise ratio measured value for the serving cell c, and $N_{r,c}$ represents a number of receiving antennas of an evolved node B (eNB) of the serving cell c.

6. The apparatus of claim 1, the uplink power control module operable on the processor circuit to determine the SINR parameter according to:

$$SINR_{opt,c}(j) = \begin{cases} \max(SINR_{MIN,c}(dB), 10\log10(\alpha_c(j)) + CINR_{DL,c}(dB)), & \text{if } \alpha_c(j) \neq 0 \\ SINR_{MIN,c}(dB), & \text{if } \alpha_c(j) = 0, \end{cases}$$

where $SINR_{opt,c}(j)$ represents the SINR parameter, c represents the serving cell, j represents a PUSCH transmission type, $SINR_{MIN,c}$(dB) represents the received control parameter, $\alpha_c(j)$ represents a fairness adjustment value for the serving cell c and the PUSCH transmission type j, and $CINR_{DL,c}$(dB) represents a downlink (DL) carrier-to-interference-and-noise ratio for the serving cell c.

7. The apparatus of claim 3, the uplink power control module operable on the processor circuit to determine $P_{O\_PUSCH,c}(j)$ according to:

$$P_{O\_PUSCH,c}(j) = P_{O\_NOMINAL\_PUSCH,c}(j) + P_{O\_UE\_PUSCH,c}(j),$$

where $P_{O\_NOMINAL\_PUSCH,c}(j)$ is a cell-specific parameter for the serving cell c and the PUSCH transmission type j and $P_{O\_UE\_PUSCH,c}(j)$ is a UE-specific parameter provided by radio resource control (RRC) signaling for the serving cell c and the PUSCH transmission type j.

8. The apparatus of claim 3, the parameter $P_{O\_NOMINAL\_PUSCH,c}(j)$ set according to:

$$P_{O\_NOMINAL\_PUSCH,c}(j) = \text{Quantization}(NI),$$

where NI represents an average power level of noise and interference per resource block and Quantization(NI) quantizes values of NI in 1 dBm increments in a range of −126 to 24 dBm.

9. The apparatus of claim 1, comprising a touch screen display communicatively coupled to the processor circuit.

10. A method, comprising:
reading a set of control parameters sent in a downlink message from a serving cell;
determining a signal-to-noise-and-interference ratio (SINR) parameter from a control parameter denoting a minimum expected cell edge SINR value for the serving cell, the control parameter comprised among the set of control parameters;
applying the SINR parameter based on the set of control parameters to determine physical uplink shared channel (PUSCH) power to be applied for a PUSCH transmission;
determining whether a physical uplink control channel (PUCCH) transmission is to accompany the PUSCH transmission; and setting the PUSCH power according to whether the PUCCH transmission is to accompany the PUSCH transmission.

11. The method of claim 10, comprising:
determining that no PUCCH transmission is to accompany the PUSCH transmission; and
applying full pathloss compensation to determine the PUSCH power for a subframe i and serving cell c according to according to:

$$P_{PUSCH,c}(i) = \min\begin{cases} P_{CMAX,c}(i), \\ 10\log_{10}(M_{PUSCH,c}(i)) + P_{O\_PUSCH,c}(j) + PL_c + SINR_{opt,c}(j) + \Delta_{TF,c}(i) + f_c(i) \end{cases}.$$

where $P_{PUSCH,c}(i)$ represents the PUSCH power for the subframe i and the serving cell c, $P_{CMAX,c}(i)$ represents a configured user equipment (UE) transmit power for the subframe i and the serving cell c, $M_{PUSCH,c}(i)$ represents a bandwidth, in resource blocks, of a PUSCH resource assignment for the subframe i and the serving cell c, j represents a PUSCH transmission type, $P_{O\_PUSCH,c}(j)$ represents a power base value for the PUSCH transmission type j, $PL_c$ represents a downlink pathloss estimate for the serving cell c, $SINR_{opt,c}(j)$ represents the SINR parameter, $\Delta_{TF,c}(i)$ represents an adjustment for a data rate for the subframe i and the serving cell c, and $f_c(i)$ represents a PUSCH power control adjustment state for the subframe i and the serving cell c.

12. The method of claim 10, comprising determining the SINR parameter according to:

$$SINR_{opt,c}(j) = 10\log10\left(\max\left(10^{\wedge}\left(\frac{SINR_{MIN,c}(dB)}{10}\right), \alpha_c(j) \cdot CINR_{DL,c} - \frac{1}{N_{r,c}}\right)\right),$$

where $SINR_{opt,c}(j)$ represents the SINR parameter, c represents the serving cell, j represents a PUSCH transmission type, $SINR_{MIN,c}$(dB) represents the control parameter, $\alpha_c(j)$ represents a fairness adjustment value for the serving cell and the PUSCH transmission type j, $CINR_{DL,c}$ represents a downlink (DL) carrier-to-interference-and-noise ratio measured value for the serving cell c, and $N_{r,c}$ represents a number of receiving antennas of an evolved node B (eNB) of the serving cell c.

13. The method of claim 10, comprising determining the SINR parameter according to:

$$SINR_{opt,c}(j) = \begin{cases} \max(SINR_{MIN,c}(dB), 10\log10(\alpha_c(j)) + CINR_{DL,c}(dB)), & \text{if } \alpha_c(j) \neq 0 \\ SINR_{MIN,c}(dB), & \text{if } \alpha_c(j) = 0, \end{cases}$$

where $SINR_{opt,c}(j)$ represents the SINR parameter, c represents the serving cell, j represents a PUSCH transmission type, $SINR_{MIN,c}$(dB) represents the control parameter, $\alpha_c(j)$ represents a fairness adjustment value for the serving cell c and the PUSCH transmission type j, and $CINR_{DL,c}(dB)$ represents a downlink (DL) carrier-to-interference-and-noise ratio for the serving cell c.

14. The method of claim 11 comprising determining $P_{O\_PUSCH,c}(j)$ according to:

$$P_{O\_PUSCH,c}(j) = P_{O\_NOMINAL_{PUSCH,c}}(j) + P_{O\_UE_{PUSCH,c}}(j),$$

where $P_{O\_NOMINAL_{PUSCH,c}}(j)$ is a cell-specific parameter for the serving cell c and the PUSCH transmission type j and $P_{O\_UE_{PUSCH,c}}(j)$ is a UE-specific parameter provided by radio resource control (RRC) signaling for the serving cell c and the PUSCH transmission type j.

15. At least one non-transitory computer-readable storage medium comprising a plurality of instructions that, when executed, cause a system to:
  receive a set of control parameters;
  determine a signal-to-noise-and-interference ratio (SINR) parameter from a received control parameter denoting a minimum expected cell edge SINR value for the serving cell, the received control parameter comprised among the received set of control parameters;
  apply the SINR parameter based on the received set of control parameters to determine physical uplink shared channel (PUSCH) power to be applied for a PUSCH transmission;
  determine whether a physical uplink control channel (PUCCH) transmission is to accompany the PUSCH transmission; and
  set the PUSCH power according to whether the PUCCH transmission is to accompany the PUSCH transmission.

16. The at least one non-transitory computer-readable storage medium of claim 15 comprising instructions that, when executed, cause a system to determine PUSCH power by applying full pathloss compensation.

17. The at least one non-transitory computer-readable storage medium of claim 15 comprising instructions that, when executed, cause a system to determine the PUSCH power for a subframe i and serving cell c according to:

$$P_{PUSCH,c}(i) = \min\begin{cases} P_{CMAX,c}(i), \\ 10\log_{10}(M_{PUSCH,c}(i)) + P_{O\_PUSCH,c}(j) + PL_c + SINR_{opt,c}(j) + \Delta_{TF,c}(i) + f_c(i) \end{cases}$$

when no PUCCH transmission is to accompany the PUSCH transmission, where $P_{PUSCH,c}(i)$ represents the PUSCH power for the subframe i and the serving cell c, $P_{CMAX,c}(i)$ represents a configured user equipment (UE) transmit power for the subframe i and the serving cell c, $M_{PUSCH,c}(i)$ represents a bandwidth, in resource blocks, of a PUSCH resource assignment for the subframe i and the serving cell c, j represents a PUSCH transmission type, $P_{O\_PUSCH,c}(j)$ represents a power base value for the PUSCH transmission type j, $PL_c$ represents a downlink pathloss estimate for the serving cell c, $SINR_{opt,c}(j)$ represents the SINR parameter, $\Delta_{TF,c}(i)$ represents an adjustment for a data rate for the subframe i and the serving cell c, and $f_c(i)$ represents a PUSCH power control adjustment state for the subframe i and the serving cell c.

18. The at least one non-transitory computer-readable storage medium of claim 15 comprising instructions that, when executed, cause a system to determine the PUSCH power for a subframe i and serving cell c according to:

$$P_{PUSCH,c}(i) = \min\begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + PL_c + SINR_{opt,c}(j) + \Delta_{TF,c}(i) + f_c(i) \end{cases}$$

when PUCCH transmission is to accompany the PUSCH transmission, where $P_{PUSCH,c}(i)$ represents the PUSCH power for the subframe i and the serving cell c, $\hat{P}_{CMAX,c}(i)$ represents a linear value of a configured user equipment (UE) transmit power for the subframe i and the serving cell c, $\hat{P}_{PUCCH}(i)$ represents linear value of a PUCCH transmit power for the subframe i, $M_{PUSCH,c}(i)$ represents a bandwidth, in resource blocks, of a PUSCH resource assignment for the subframe i and the serving cell c, j represents a PUSCH transmission type, $P_{C\_PUSCH,c}(i)$ represents a power base value for the PUSCH transmission type j, $PL_c$ represents a downlink pathloss estimate for the serving cell c, $SINR_{opt,c}(j)$ represents the SINR parameter, $\Delta_{TF,c}(i)$ represents an adjustment for a data rate for the subframe i and the serving cell c, and $f_c(i)$ represents a PUSCH power control adjustment state for the subframe i and the serving cell c.

19. The at least one non-transitory computer-readable storage medium of claim 18 comprising instructions that, when executed, cause a system to determine the SINR parameter according to:

$$SINR_{opt,c}(j) = 10\log 10\left(\max\left(10^{\wedge}\left(\frac{SINR_{MIN,c}(dB)}{10}\right), \alpha_c(j) \cdot CINR_{DL,c} - \frac{1}{N_{r,c}}\right)\right),$$

where $SINR_{opt,c}(j)$ represents the SINR parameter, c represents the serving cell, j represents a PUSCH transmission type, $SINR_{MIN,c}(dB)$ represents the received control parameter, $\alpha_c(j)$ represents a fairness adjustment value for the serving cell c and the PUSCH transmission type j, $CINR_{DL,c}$ represents a downlink (DL) carrier-to-interference-and-noise ratio measured value for the serving cell c, and $N_{r,c}$ represents a number of receiving antennas of an evolved node B (eNB) of the serving cell c.

20. The at least one non-transitory computer-readable storage medium of claim 18 comprising instructions that, when executed, cause a system to determine the SINR parameter according to:

$$SINR_{opt,c}(j) = \begin{cases} \max(SINR_{MIN,c}(\text{dB}), 10\log10(\alpha_c(j)) + CINR_{DL,c}(\text{dB})), & \text{if } \alpha_c(j) \neq 0 \\ SINR_{MIN,c}(\text{dB}), & \text{if } \alpha_c(j) = 0, \end{cases}$$

where $SINR_{opt,c}(j)$ represents the SINR parameter, c represents the serving cell, j represents a PUSCH transmission type, $SINR_{MIN,c}(\text{dB})$ represents the received control parameter, $\alpha_c(j)$ represents a fairness adjustment value for the serving cell c and the PUSCH transmission type j, and $CINR_{DL,c}(\text{dB})$ represents a downlink (DL) carrier-to-interference-and-noise ratio for the serving cell c.

21. The at least one non-transitory computer-readable storage medium of claim 15 comprising instructions that, when executed, cause a system to determine $P_{O\_PUSCH,c}(j)$ according to:

$$P_{O\_PUSCH,c}(j) = P_{O\_NOMINAL\_PUSCH,c}(j) + P_{O\_UE\_PUSCH,c}(j),$$

where $P_{O\_NOMINAL\_PUSCH,c}(j)$ is a cell-specific parameter for the serving cell c and the PUSCH transmission type j and $P_{O\_UE\_PUSCH,c}(j)$ is a UE-specific parameter provided by radio resource control (RRC) signaling for the serving cell c and the PUSCH transmission type j.

22. The at least one non-transitory computer-readable storage medium of claim 21, the parameter $P_{O\_NOMINAL\_PUSCH,c}(j)$ set according to:

$$P_{O\_NOMINAL\_PUSCH,c}(j) = \text{Quantization}(NI),$$

where NI represents an average power level of noise and interference per resource block and Quantization (NI) quantizes values of NI in 1 dBm increments in a range of −126 to 24 dBm.

* * * * *